United States Patent
Bae et al.

(10) Patent No.: US 9,471,162 B2
(45) Date of Patent: Oct. 18, 2016

(54) DISPLAY APPARATUS AND METHOD OF CONTROLLING THE SAME

(71) Applicant: SAMSUNG ELECTRONICS CO., LTD., Suwon-si (KR)

(72) Inventors: Kee Sung Bae, Suwon-si (KR); Sang Bae Park, Cheongju-si (KR); Sang Hoon Lee, Incheon (KR); Jae Hoon Jeong, Suwon-si (KR); Kyung Sun Cho, Seoul (KR); Seong Seol Hong, Yongin-si (KR); Dong Jin Lee, Suwon-si (KR); Mi Jin Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 14/508,251

(22) Filed: Oct. 7, 2014

(65) Prior Publication Data

US 2015/0160748 A1  Jun. 11, 2015

(30) Foreign Application Priority Data

Dec. 11, 2013  (KR) .................. 10-2013-0153911

(51) Int. Cl.
*G06F 3/041* (2006.01)
*G06F 1/16* (2006.01)

(52) U.S. Cl.
CPC ............. *G06F 3/041* (2013.01); *G06F 1/1652* (2013.01); *G06F 2203/04102* (2013.01)

(58) Field of Classification Search
None
See application file for complete search history.

(56) References Cited

U.S. PATENT DOCUMENTS

| 2009/0064009 | A1* | 3/2009 | Krantz | G06F 3/04815 715/764 |
| 2010/0315436 | A1* | 12/2010 | Chan | G06F 3/1431 345/660 |
| 2012/0320006 | A1* | 12/2012 | Koebrich | G09G 3/2096 345/204 |
| 2015/0301781 | A1* | 10/2015 | Ekkaia | G06F 3/1446 362/237 |

* cited by examiner

*Primary Examiner* — Joseph Haley
*Assistant Examiner* — Emily Frank
(74) *Attorney, Agent, or Firm* — Sughrue Mion, PLLC

(57) ABSTRACT

A display apparatus and method are provided. The display apparatus includes a display including a plurality of independent display elements (IDEs) configured for shape deformation, and a controller configured to determine whether the display is deformed by transmitting a plurality of signals to the plurality of IDEs and receiving signals output from the plurality of IDEs in response to the transmitted signals.

29 Claims, 13 Drawing Sheets

FIG. 4
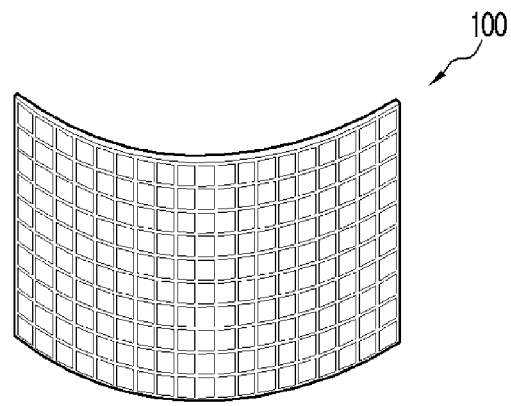
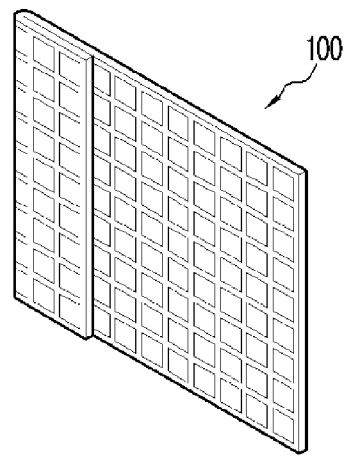
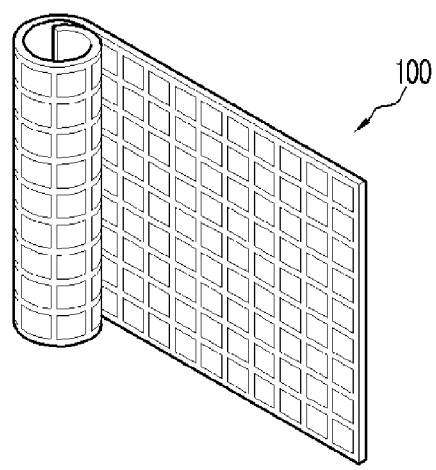

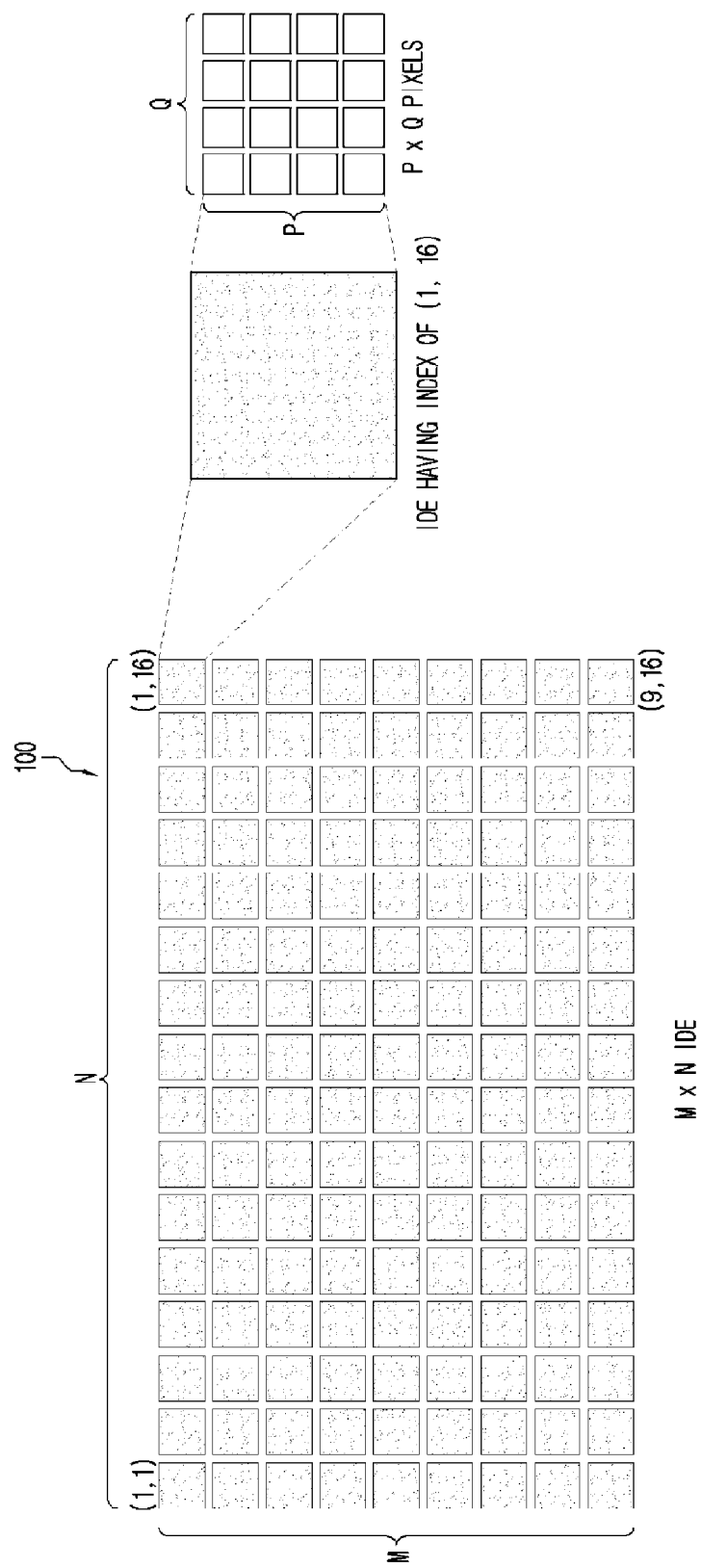

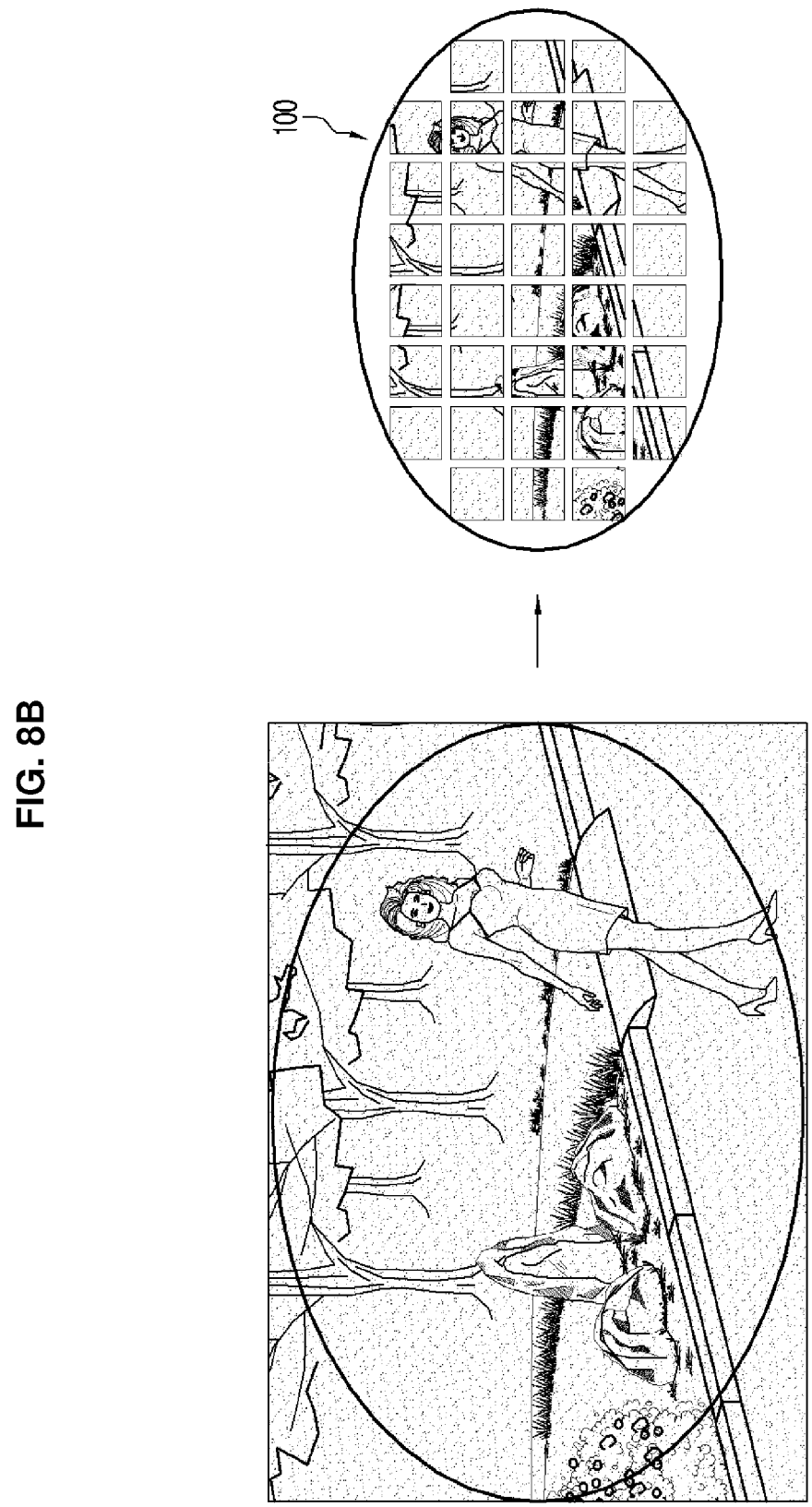

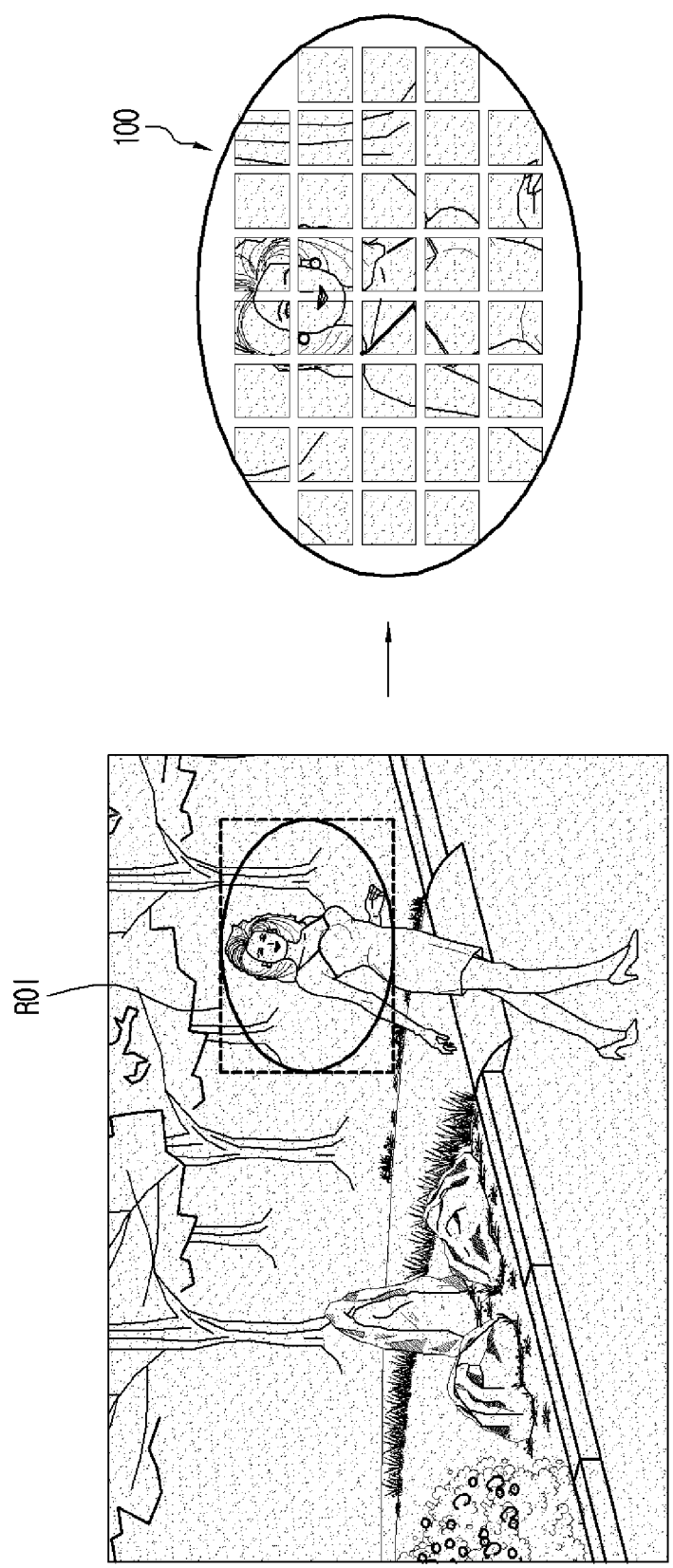

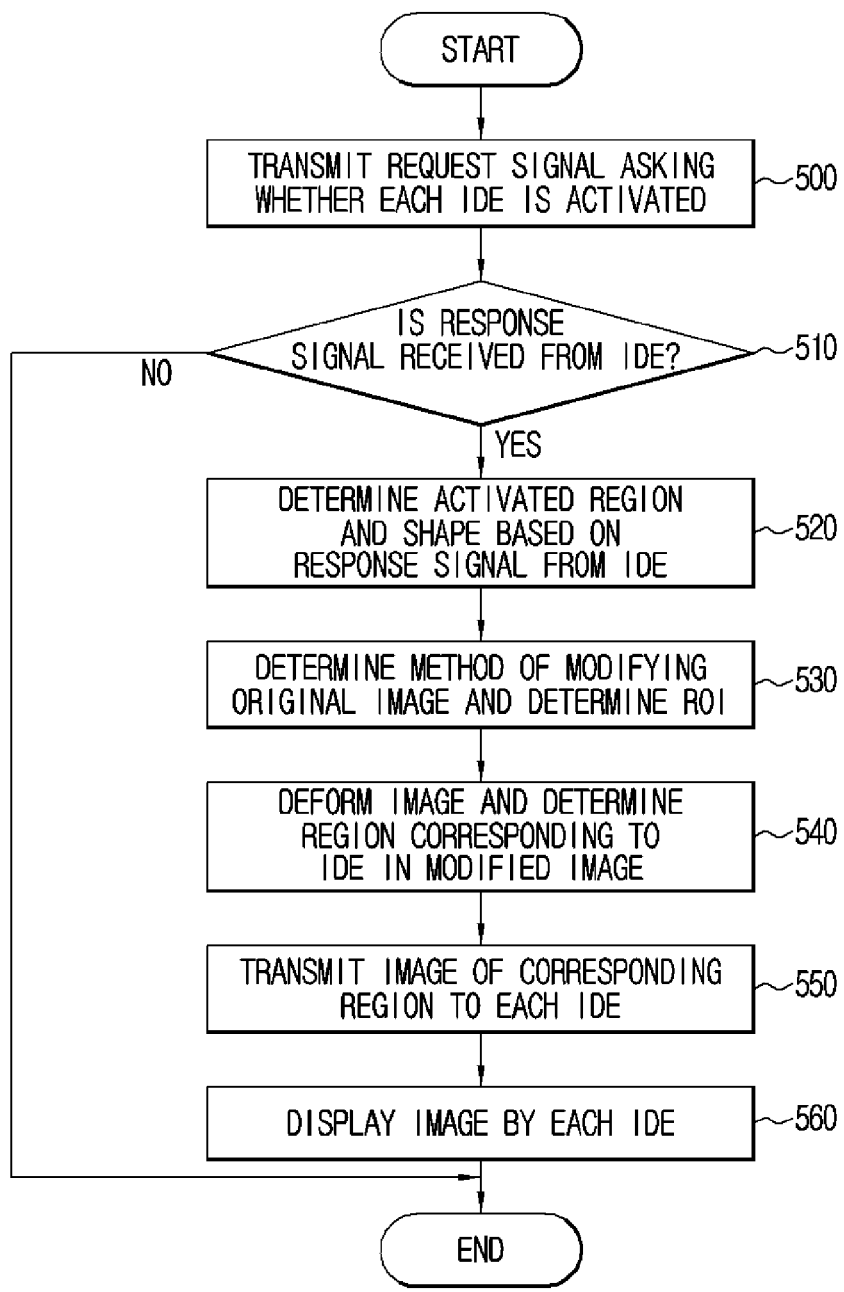

DISPLAY APPARATUS AND METHOD OF CONTROLLING THE SAME

CROSS-REFERENCE TO RELATED APPLICATION(S)

This application claims the benefit under 35 USC §119(a) of Korean Patent Application No. 10-2013-0153911, filed on Dec. 11, 2013, in the Korean Intellectual Property Office, the entire disclosure of which is incorporated herein by reference.

BACKGROUND

1. Field

Apparatuses and methods consistent with exemplary embodiments relate to display apparatuses implemented in various shapes and methods of controlling the same.

2. Description of Related Art

Recently, display technology as a communication medium for human-machine or human-human interaction has been drawing more attention with the development of information society. In addition, the need for lightweight and thin displays is increasing with the recent advance of computer and media industries. As an example, flexible displays have been introduced in an effort to meet the needs of users.

A flexible display is a display that can be folded or bent like paper. The flexible display may be a reflective display that has excellent visibility by providing high resolution and wide viewing angles. The flexible display may be implemented through any type of substrate such as a plastic, metal, or paper substrate, and may not include or need a backlight unit thereby reducing manufacturing costs and weight thereof. In addition, the flexible display may be implemented in a large area. As an example, the flexible display may be implemented as a paper-like display.

Typical displays provide a rectangular shape display. However, there is a desire to develop displays that have shapes that differ from the conventional rectangular shape.

SUMMARY

Exemplary embodiments overcome the above disadvantages and other disadvantages not described above. Also, an exemplary embodiment is not required to overcome the disadvantages described above, and an exemplary embodiment of the present inventive concept may not overcome any of the problems described above.

One or more exemplary embodiments provide display apparatuses including independent display elements and methods of controlling the same.

Additional aspects of the exemplary embodiments will be set forth in part in the description which follows and, in part, will be obvious from the description, or may be learned by practice of the invention.

According to an aspect of an exemplary embodiment, there is provided a display apparatus that includes a display including a plurality of independent display elements (IDEs) configured for shape deformation, and a controller configured to determine whether the display is deformed by transmitting a plurality of signals to the plurality of IDEs and receiving signals output from the plurality of IDEs in response to the transmitted signals.

A shape of the display may be deformed by removing some IDEs from or adding some IDEs to the plurality of IDEs.

Each IDE may have an index indicating a physical location of the IDE on the display.

The plurality of transmitted signals may include a request signal asking whether a respective IDE is in a state capable of displaying an image.

The controller may transmit the request signal to each of the plurality of IDEs included in the display before deformation.

The output signals may include a response signal indicating that a respective IDE is in a state capable of displaying an image.

The controller may receive the response signal from each IDE included in the deformed display.

The response signal may have an index.

The controller may determine a shape of the deformed display based on indexes included in the response signals.

The controller may determine a method of processing an image based on the shape of the deformed display.

The method of processing the image may include resizing the image or clipping the image to correspond to the shape of the deformed display.

The controller may process the image according to the determined image processing method.

The controller may determine a region to be displayed by the as the IDEs included in the deformed display unit in the processed image.

Each of the IDEs included in the deformed display may display the processed image to correspond to the determined region.

The display may comprise a flexible display, and the flexible display may be deformed by a user cutting or tearing IDEs from the flexible display.

According to an aspect of another exemplary embodiment, there is provided a method of controlling a display apparatus that includes transmitting a plurality of signals to a display including a plurality of independent display elements (IDEs) configured for shape deformation, and determining whether the display is deformed based on signals received from the plurality of IDEs in response to the transmitted signals.

A shape of the display may be deformed by removing some IDEs from or by adding some IDEs to the plurality of IDEs.

Each IDE may have an index indicating a physical location of the IDE on the display.

The transmitting of the plurality of signals may include transmitting a request signal asking whether a respective IDE is in a state capable of displaying an image.

The transmitting of the plurality of signals may include transmitting the request signal to each IDE included in the display before deformation.

The receiving of the output signals may include receiving a response signal indicating that a respective IDE is in a state capable of displaying an image.

The receiving of the output signals may include receiving the response signal from each IDE included in the deformed display.

The response signal may have an index.

The determining whether the display is deformed may include determining a shape of the deformed display based on indexes included in the response signals.

The method may further include determining a method of processing an image based on the shape of the deformed display unit.

The method of processing the image may include resizing the image or clipping the image to correspond to the shape of the deformed display.

The method may further include processing the image according to the determined image processing method.

The method may further include determining a region to be displayed by the IDEs included in the deformed display in the processed image.

The method may further include displaying the processed image to correspond to the determined region by each of the IDEs included in the deformed display.

According to an aspect of another exemplary embodiment, there is provided a control apparatus for controlling a plurality of independent display elements (IDEs) of a display, the control apparatus including a communicator configured to transmit and receive signals to and from the plurality of IDEs included in the display, and a controller configured to determine IDEs that are active and IDEs that are inactive, based on signals received from the plurality of IDEs, and to transmit a display signal to the plurality of IDEs based on a shape of the IDEs that are inactive.

The controller may determine the shape based on indexes included the signals received from the plurality of IDEs According to the exemplary embodiments of the display apparatus and the method of controlling the same, the shape of the display may be deformed as desired, and an image may be displayed even when independent display elements are partially inactivated.

BRIEF DESCRIPTION OF THE DRAWINGS

These and/or other aspects will become apparent and more readily appreciated from the following description of the embodiments with reference to the accompanying drawings of which:

FIG. 4 is a diagram illustrating three-dimensional shape deformations of a display unit of a flexible display according to an exemplary embodiment;

FIG. 5 is a diagram illustrating a two-dimensional structure of a display unit of a flexible display according to an exemplary embodiment;

FIGS. 8A through 8C are diagrams illustrating various methods of modifying an original image according to an exemplary embodiment; and FIG. 9 is a flowchart illustrating a method of controlling a display apparatus according to an exemplary embodiment.

DETAILED DESCRIPTION

Figure 1A:
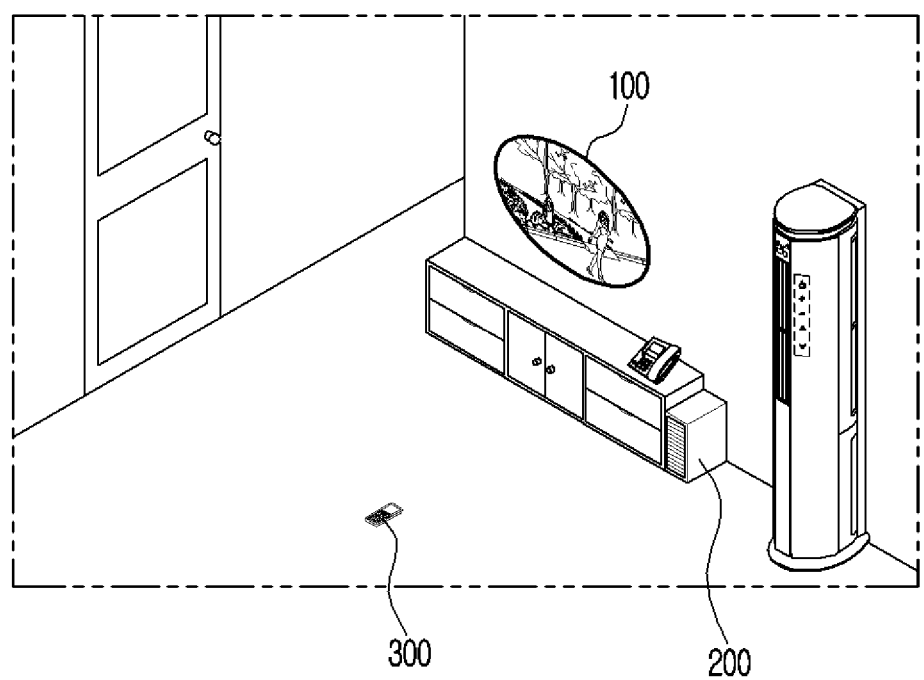
FIGS. 1A and 1B are diagrams illustrating a mounted display apparatus according to an exemplary embodiment.

Reference will now be made in detail to the exemplary embodiments, examples of which are illustrated in the accompanying drawings, wherein like reference numerals will be understood to refer to like elements throughout. The drawings may not be to scale, and the relative size, proportions, and depiction of elements in the drawings may be exaggerated for clarity, illustration, and convenience.

Hereinafter, a display apparatus and a method of controlling the same will be described in detail with reference to the accompanying drawings.

Figure 1B:
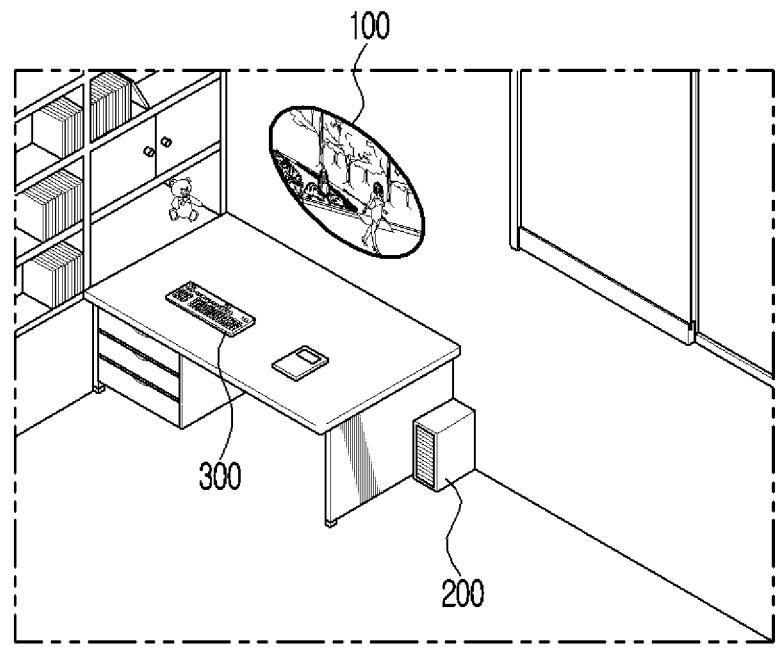

FIGS. 1A and 1B are diagrams illustrating a mounted display apparatus according to an exemplary embodiment.

Referring to FIGS. 1A and 1B, the mounted display apparatus includes a display unit 100, a main body 200, and an input unit 300. The display unit 100 displays an image and may be used in not only portable devices such as smart phones, portable multimedia players (PMPs), personal digital assistants (PDAs), tablets, and navigators, but also stationary devices such as televisions, monitors, appliances, kiosks, and the like.

FIG. 1A illustrates a display device 100 used as a TV, and FIG. 1B illustrates a display device 100 used with or as a personal computer. As illustrated therein, the display unit 100 may have a circular shape, oval shape, and the like, instead of conventional rectangular shapes and may be mounted, for example, on a table in a living room, on a desk in a study room, and the like, to allow a user to watch a displayed image. However, exemplary embodiments are not limited thereto, and the display unit 100 may be mounted in different locations for convenience of the user.

The main body 200 may include most of the elements of the display apparatus. For example, the main body 200 may include a communication unit 210 (FIG. 2) to connect the display unit 100 and the input unit 300 in a wired or wireless manner. Thus, signals may be transmitted and received between the main body 200 and the display unit 100, between the main body 200 and the input unit 300, and the like.

The input unit 300 may receive instructions or information regarding operation of the display apparatus based on a user input. For example, the user may input an instruction to enlarge or reduce an image or to select a region of interest (ROI) on the display device 100 through the input unit 300.

For example, the input unit 300 may include a remote control, a keyboard, a touch pad, a mouse, a vocal command recognizer, and the like. Particularly, the input unit 300 may include a key pad, a dome switch, a touch pad, and the like, which receive input via a press or touch of the user. In addition, the input unit 300 may include a jog wheel, a joystick, a finger mouse, and the like.

Figure 2:
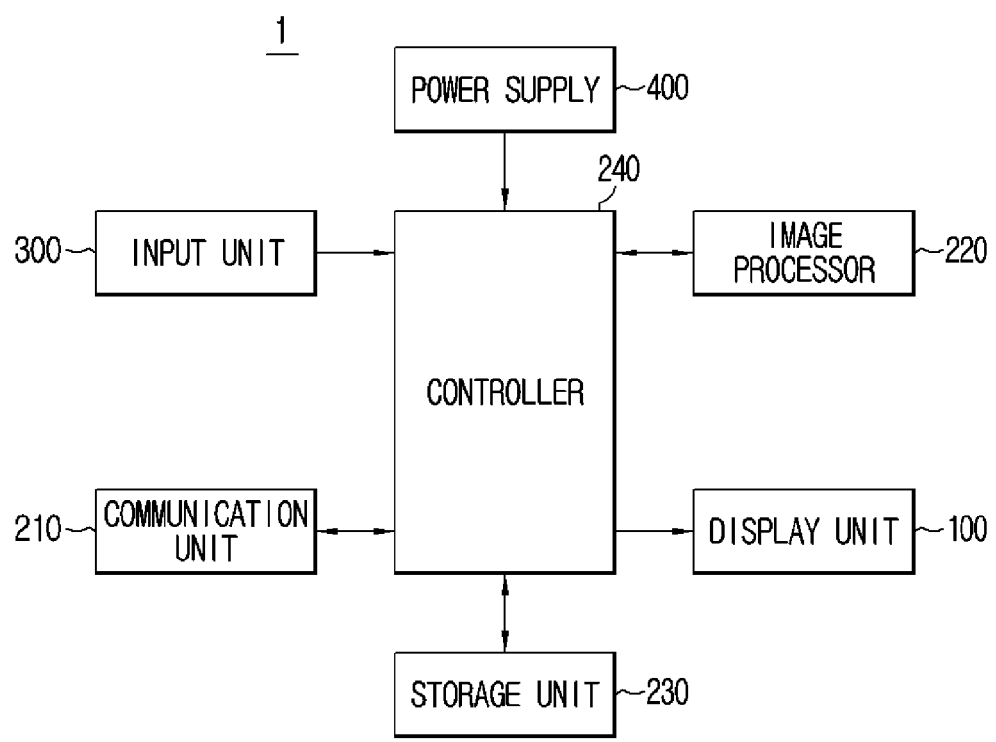
FIG. 2 is a control block diagram illustrating a display apparatus according to an exemplary embodiment.

FIG. 2 is a control block diagram illustrating a display apparatus according to an exemplary embodiment.

Referring to FIG. 2, display apparatus 1 includes a power supply 400, a display unit 100, a communication unit 210, an image processor 220, a controller 240, a storage unit 230, and an input unit 300. The display apparatus 1 may perform image processing in accordance with a shape of the display unit 100 and display a processed image on the display unit 100. The power supply 400 may receive external or internal power in response to a control signal from the controller 240 to supply power for operation of each element of the display apparatus 1.

The display unit 100 may constitute a flexible display, and various examples of the display unit 100 are illustrated in FIGS. 3 through 7.

Figure 3:
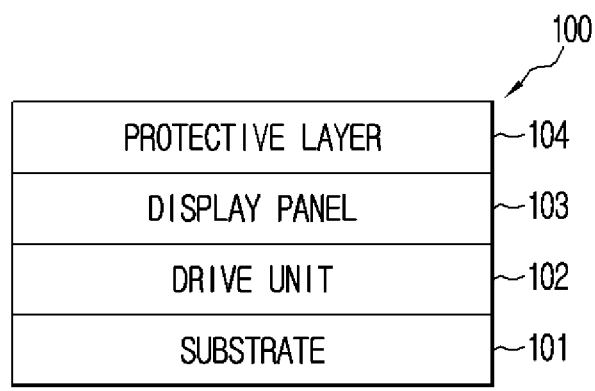
FIG. 3 is a diagram illustrating a three-dimensional structure of a display unit of a flexible display according to an exemplary embodiment.

FIG. 3 is a diagram illustrating a three-dimensional structure of the display unit 100 of a flexible display. Referring to FIG. 3, the display unit 100 includes a substrate 101, a drive unit 102, a display panel 103, and a protective layer 114.

A flexible display refers to a display that may be crooked, bent, folded, rolled, and the like, such as a piece of paper, while maintaining display characteristics of a flat panel display. Accordingly, the flexible display may be manufactured on a thin flexible substrate.

The substrate 101 may be implemented using a plastic substrate, such as a polymer film, which is deformable under an external pressure. The plastic substrate may be prepared by applying a barrier coating on both surfaces of a base film. For example, the base film may be formed using a variety of resins such as polyimide (PI), polycarbonite (PC), polyethyleneterephtalate (PET), polyether-sulfone (PES), polythylenenaphthalate (PEN), fiber reinforced plastic (FRP), and the like. The barrier coating is applied to opposing surfaces of the base film, and an organic or inorganic film may be used to maintain flexibility. The substrate 101 may also be formed of a flexible material such as thin glass or metal foil in addition to the plastic substrate.

The drive unit 102 drives the display panel 103. The drive unit 102 may apply a driving voltage to a plurality of pixels of the display panel 103. For example, the drive unit 102 may include an amorphous silicon thin film transistor (a-si TFT), a low temperature poly silicon (LTPS) TFT, an organic thin film transistor (OTFT), and the like.

The drive unit 102 may also be implemented in various forms according to the display panel 103. For example, the display panel 103 may include an organic light emitting element including a plurality of pixels and electrode layers covering both surfaces of the organic light emitting element. In this example, the drive unit 102 may include a plurality of transistors respectively corresponding to each of the pixels of the display panel 103. The controller 240 may apply an electric signal to a gate of each transistor to control the pixels connected to the transistors to emit light. As a result, an image is displayed.

For example, the display panel 103 may be implemented using an organic light emitting diode, an electro luminescent (EL) display, an electrophoretic display (EPD), an electrochromic display (ECD), a liquid crystal display (LCD), an active matrix liquid crystal display (AMLCD), a plasma display panel (PDP), and the like. As another example, the display panel may be implemented by a liquid crystal (LCD) display design, for example, an LCD which does not include a backlight unit and instead uses ambient light. For example, the LCD display panel may be operated in an environment having a large amount of ambient light such as an outdoor environment.

The protective layer 104 serves to protect the display panel 103. For example, the protective layer 104 may be formed of ZrO, $CeO_2$, $ThO_2$, and the like. The protective layer 104 may be formed as a transparent film and may cover an entire surface of the display panel 103.

Alternatively from the example of FIG. 3, the display unit 100 may be implemented using electronic paper (e-paper). The e-paper may be a display manufactured by applying general characteristics of ink to paper and is different from some other displays in that the e-paper uses reflected light. The e-paper may change a picture or text through electrophoresis by using a twist ball or a capsule.

The display unit 100 may include a component formed of a transparent material. When, the substrate 101 is formed of a polymer such as a transparent plastic, the drive unit 102 may be implemented using a transparent transistor, and the display panel 103 may be implemented using a transparent organic light emitting layer and a transparent electrode. Accordingly, the display unit 100 may be transparent.

A transparent transistor may be a transistor manufactured by replacing opaque silicon of an existing thin film transistor with a transparent material such as zinc oxide and titanium oxide. The transparent electrode may be formed of advanced materials such as indium tin oxide (ITO) or graphene which has a planar structure in a shape of a honeycomb, in which carbon atoms are connected to one another, and which is transparent. The transparent organic light emitting layer may be implemented using various materials.

FIG. 4 is a diagram illustrating three-dimensional shape deformations of a display unit of a flexible display according to an exemplary embodiment.

The display unit 100 may be bent by an external pressure causing it to be deformed. In this regard, shape deformation caused by bending may be defined as a three-dimensional shape deformation. Examples of deformation include bending as illustrated in a first diagram of FIG. 4, folding as illustrated in a second diagram of FIG. 4, and rolling as illustrated in a third diagram of FIG. 4.

The bending refers to a state in which the display unit 100 is bent and is different from the folding and the rolling in that the bent surfaces are not contacting each other.

The folding refers to a state in which the display unit 100 is folded. The folding state and the bending state may be distinguished from each other by a degree of bending. For example, when an amount of bend is more than a predetermined radius of curvature, the state may be defined as the folding state. On the other hand, when an amount of bend is less than the predetermined radius of curvature, the state may be defined as the bending state.

The rolling refers to a state in which the display unit 100 is rolled. The rolling may also be determined based on the radius of curvature. For example, when an amount of bend is more than a predetermined radius of curvature continuously over a predetermined area, the bending is defined as the rolling state. On the other hand, when an amount of bend is more than the predetermined radius of curvature in a relatively small area, the bending may be defined as the folding state.

It should be appreciated that these are merely examples of shape deformation of the display unit 100 and may be defined differently according to the type, size, weight, and characteristics of the display unit 100. For example, the display unit 100 may be bent to an extent that the surfaces are in contact with each other. In this example, a state in which the surfaces of the display unit 100 are in contact with each other by bending may be defined as folding, and a state in which a front surface and a rear surface of the display unit 100 are in contact with each other by bending may be defined as rolling.

FIG. 5 is a diagram illustrating a two-dimensional structure of a display unit of a flexible display according to an exemplary embodiment.

The display unit 100 may include a plurality of independent display elements (IDEs). The longitudinal direction of the display unit 100 may be defined as columns, and the lateral direction may be defined as rows. Accordingly, the display unit 100 includes a plurality of IDEs, which have M rows arranged along the longitudinal direction and N columns arranged along the lateral direction, making an overall rectangular shape. In this regard, M and N may be an integer of 1 or greater and may be identical to each other or different. In addition, the plurality of IDEs may have the same size and same shape or different sizes and/or different shapes. Each of the IDEs may have an index indicating a physical location thereof. In some examples, the index may be a two-dimensional index.

The display unit 100 may include a plurality of IDEs as described above from the manufacturing process, and the index of each IDE of the display unit 100 may be pre-stored in the storage unit 230.

FIG. 5 illustrates an example in which the display unit 100 includes a plurality of IDEs in which M is 9 and N is 16, that is, a plurality of IDEs having 9 rows and 16 columns. In addition, all of the IDEs of the display unit 100 respectively have a square shape with the same size, and each of the IDEs has a two-dimensional index defined according to the rows and columns.

For example, an IDE located in at a first row of a first column, i.e., in row 1 and column 1, of the display unit 100 has an index of (1,1), and an IDE located at a last row of a last column, i.e., in row 9 and column 16, of the display unit 100 has an index of (9,16). The index of each of the IDEs of the display unit 100, i.e., indexes (1,1) to (9,16) may be pre-stored in the storage unit 230.

One or more of the IDEs may include a plurality of pixels. For example, each of the IDEs may include at least one pixel having P rows arranged along the longitudinal direction and Q columns arranged along the lateral direction. In this regard, P and Q may be independent of each other and be an integer of 1 or greater The number of pixels included in each IDE may be the same or different according to the size and shape of the IDE. As another example, the IDEs may have a different number of pixels which varies according to the size or shape of the IDE.

FIG. 5 illustrates that the IDEs have the same shape and the same number of pixels. Particularly, each of the IDEs includes 16 pixels, in which P is 4 and Q is 4, i.e., 16 pixels having 4 rows and 4 columns.

The display unit 100 in this example has a rectangular shape, but the shape of the display unit 100 may also be changed via manipulation by a user. For more descriptions therefor, the display unit 100 having the rectangular shape as described above is referred to as an initial display unit 100, and descriptions with reference to FIGS. 6A and 6B are based thereon.

Figure 6A:
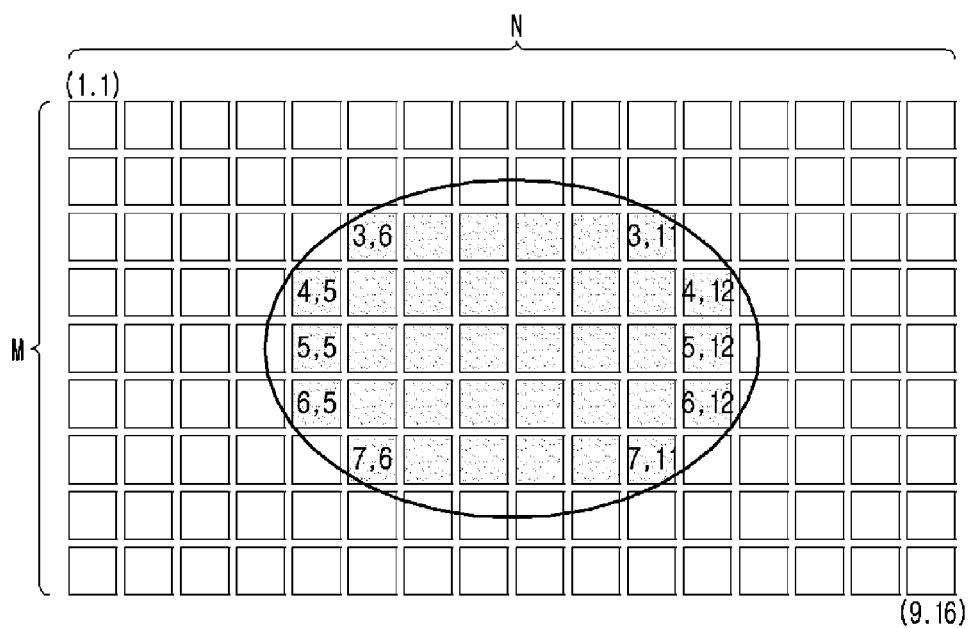
FIGS. 6A and 6B are diagrams illustrating two-dimensional deformations of a display unit of a flexible display according to an exemplary embodiment.
Figure 6B:
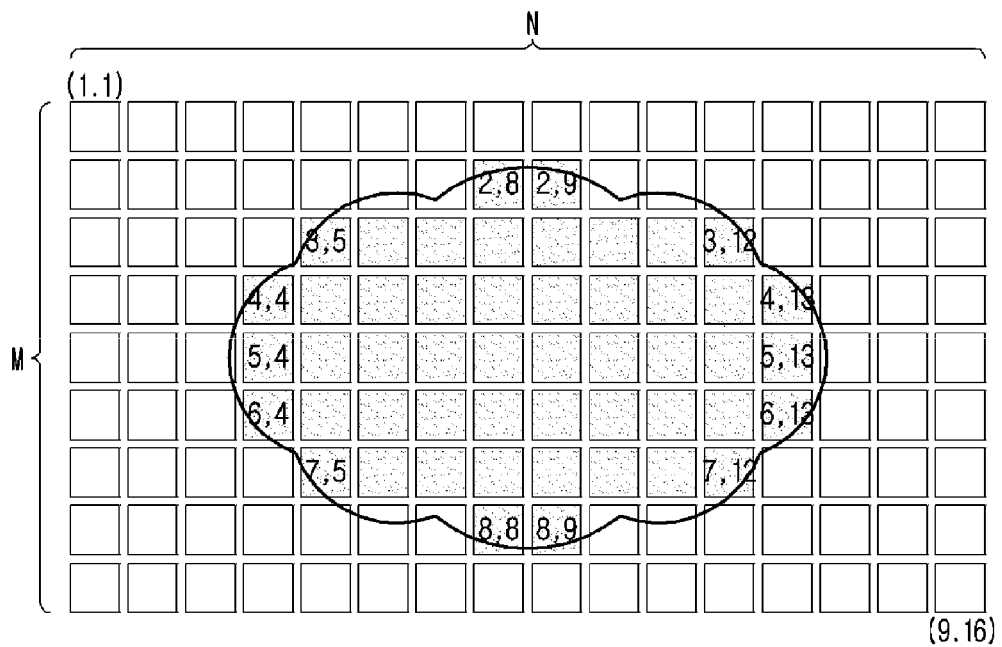

FIGS. 6A and 6B are diagrams illustrating two-dimensional deformations of a display unit of a flexible display according to an exemplary embodiment.

A user may manipulate the rectangular display unit 100 to display an overall oval shape. In other words, the user may select not to use some IDEs or acquire some IDEs from the initial display unit 100 including a plurality of IDEs to form an oval-shaped display unit 100.

The user may produce the oval display unit 100 as illustrated in FIG. 6A by removing or otherwise not using IDEs except for IDEs constituting the oval shape, i.e., except for 6 IDEs having indexes from (3,6) to (3,11) located in row 3, 8 IDEs having indexes (4,5) to (4,12) located in row 4, 8 IDEs having indexes (5,5) to (5,12) located in row 5, 8 IDEs having indexes (6,5) to (6,12) located in row 6, and 6 IDEs having indexes (7,6) to (7,11) located in row 7, by cutting or tearing the display unit 100. Alternatively, the user may deform the rectangular initial display unit 100 to the oval display unit 100 by acquiring or adding IDEs to create the oval shape by cutting or tearing.

The user may manipulate the rectangular initial display unit 100 to an overall cloud shape. For example, the user may remove some IDEs or acquire some IDEs from the initial display unit 100 including the plurality of IDEs to form a cloud-shaped display unit 100.

The user may produce the cloud-shaped display unit 100 as illustrated in FIG. 6B by removing IDEs except for IDEs constituting the cloud shape, i.e., except for 2 IDEs having indexes from (2,8) to (2,9) located in row 2, 8 IDEs having indexes from (3,5) to (3,12) located in row 3, 10 IDEs having indexes from (4,4) to (4,13) located in row 4, 10 IDEs having indexes from (5,4) to (5,13) located in row 5, 10 IDEs having indexes from (6,4) to (6,13) located in row 6, 8 IDEs having indexes from (7,5) to (7,12) located in row 7, and 2 IDEs having indexes from (8,8) to (8,9) located in row 8, by cutting or tearing. As another example, the user may deform the rectangular initial display unit 100 to the cloud-shaped display unit 100 by acquiring IDEs constituting the cloud-shape by cutting or tearing.

Figure 7:
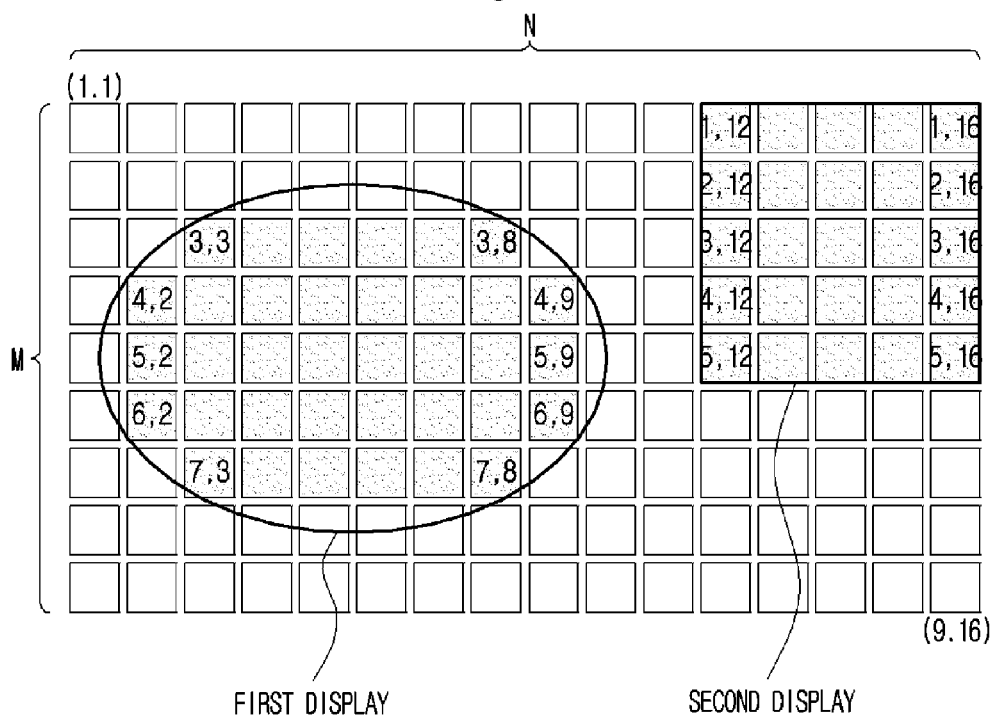
FIG. 7 illustrates the display unit that has a plurality of displays via a two-dimensional deformation according to an exemplary embodiment.

The display unit 100 including a single display is described above. However, the display unit 100 may also include multiple displays. For example, the display unit 100 may include at least two displays as illustrated in FIG. 7. In FIG. 7, the display unit includes a plurality of displays via a two-dimensional deformation.

Referring to FIG. 7, the user may manipulate the rectangular display unit 100 such that the display unit 100 includes a first display shaped as an oval and a second display shaped as a square.

For example, as illustrated above with reference to FIG. 5, the user may acquire IDEs constituting the first oval shape from the initial display unit 100 including the plurality of IDEs by cutting or tearing. In other words, the oval display of the display unit 100 may be produced by acquiring 6 IDEs having indexes from (3,3) to (3,8) from row 3, 8 IDEs having indexes from (4,2) to (4,9) from row 4, 8 IDEs having indexes from (5,2) to (5,9) from row 5, 8 IDEs having indexes from (6,2) to (6,9) from row 6, and 6 IDEs having indexes from (7,3) to (7,8) from row 7.

The user may also acquire IDEs constituting the second square display from the remaining portion of the display unit 100 from which the first display is removed by cutting or tearing. In other words, the square display of the display unit 100 may be produced by acquiring 5 IDEs having indexes from (1,12) to (1,16) from row 1, 5 IDEs having indexes from (2,12) to (2,16) from row 2, 5 IDEs having indexes from (3,12) to (3,16) from row 3, 5 IDEs having indexes from (4,12) to (4,16) from row 4, and 5 IDEs having indexes from (5,12) to (5,16) from row 5.

As described above, the display unit 100 may include at least one display having various two-dimensional shapes. Hereinafter, a display unit including a single circular display is described for descriptive convenience.

The communication unit 210 may connect to components of the display apparatus 1 or various types of external devices in a wired or wireless manner to transmit and receive a signal thereto and therefrom. The communication unit 210 may include a variety of communication modules, for example, a broadcast receiving module, an Internet communication module, a local area communication module, a global positioning system (GPS) module 214, and the like.

The broadcast receiving module may include a ground-wave broadcast receiving module which includes an antenna, a demodulator, an equalizer, and the like, to receive ground-wave broadcasting signal, and a digital multimedia broadcasting (DMB) module to process received DMB signals. The Internet communication module may connect to an external network according to communication protocols such as wireless local area network (WLAN), (Wi-Fi), wireless broadband (Wibro), world interoperability for microwave access (Wimax), high speed downlink packet access (HSDPA), and the like, to perform communications.

The local area communication module may be used to communicate with a component or external device located at a close range through the local area communication such as Bluetooth, radio frequency identification (RFID), infrared data association (IrDA), ultra wideband (UWB), and Zig- Bee. The GPS module may be used to detect location information, and the like, by receiving GPS signals from a GPS satellite.

The communication unit 210 may be connected to a component of the display apparatus 1 in a wired or wireless manner to transmit and receive a signal thereto and therefrom.

According to various aspects, the communication unit 210 may transmit a request signal asking or otherwise requesting an answer as to whether each of the IDEs included in the initial display unit 100 is activated, to the IDEs, in response to a control signal from the controller 240. The communication unit 210 may receive a response signal from the IDEs included in the initial display unit 100 or a deformed display unit 100 and transmit the response signal to the image processor 220. The request signal may ask whether the IDE is in a state capable of displaying an image. The response signal may include not only the signal indicating that the IDE is in an activated state, i.e., in a state capable of displaying an image, but also an index indicating a physical location of the respective IDE with respect to the other IDEs.

When the display unit 100 is deformed via manipulation by the user as described above, the communication unit 210 may receive the response signal from each IDE of the deformed display unit 100. If the display unit 100 is not deformed, the communication unit 210 may receive the response signal from each IDE of the initial display unit 100. In this case, the index of the IDE transmitting the response signal may be stored in the storage unit 230. For example, the request signal and the response signal may be signals used to determine an overall shape of the display unit 100.

When the user inputs information about image processing via the input unit 300, the communication unit 210 transmits a signal corresponding thereto to the image processor 220. For example, upon receiving a request for enlargement or reduction of an image from the input unit 300, the communication unit 210 may transmit the received information about the image to the image processor 220. The image processor 220 may perform a deformation process by enlarging or reducing an original image in response thereto. As another example, the communication unit 210 receives information about a region of interest (ROI) from the input unit 300 and transmit the received information to the image processor 220. Accordingly, the image processor 220 may perform a deformation process on the original image based on the information regarding the ROI.

The communication unit 210 may transmit an image signal output from the image processor 220 to each of the IDEs included in the display unit 100. In these examples, the deformed display unit 100 refers to when the display unit 100 is deformed and the initial display unit 100 refers to when the display unit 100 is not deformed. The communication unit 210 may re-transmit the image signal to the IDE that has transmitted the response signal. Because the index of the IDE transmitting the response signal is stored in the storage unit 230, the communication unit 210 may transmit the image signal using the stored index.

The communication unit 210 may be connected to an external device in a wired or wireless manner, and may receive a signal generated by the external device. For example, the communication unit 210 may receive a broadcasting signal such as ground-wave broadcasting signal or a DMB signal from a broadcasting management server via a broadcast receiving module and transmit information about the image included in the broadcasting signal to the image processor 220. Alternatively, the communication unit 210 may receive an image signal from a portable terminal or an external computer through an Internet communication module or a local area communication module, and may transmit the received signal to the image processor 220.

The image processor 220 modifies the original image according to the shape of the display unit 100. For example, when the communication unit 210 transmits the image signal received from the external device to the image processor 220, the image processor 220 may modify the image signal of the original image, to the shape of the display unit 100 and re-transmit the modified image signal to the communication unit 210 such that the modified image is output through the display unit 100.

The image processor 220 determines the activated region or the shape of the display unit 100 based on the response signal received by the communication unit 210. In some examples, the response signal includes not only the signal indicating that the IDE is in an activated state, that is, in a state capable of displaying an image, but also an index indicating a physical location. Accordingly, the image processor 220 may determine the activated region or the shape of the display unit 100 by estimating locations of the IDEs transmitting the response signals based on the indexes of the IDEs included in the response signals and combining the estimated IDEs.

In addition, the image processor 220 may determine a method for modifying the original image, a method of determining the ROI, or a method of processing the ROI in accordance with the size and shape of the display unit 100. For example, the image processor 220 may determine to resize the original image at a predetermined rate, i.e., enlarging or reducing the original image at the predetermined rate. In this example, the predetermined rate may be input by the user via the input unit 300 or it may be determined by the image processor 220 through image analysis when there is no user input. In addition, the image processor 220 may determine the method of modifying the original image as clipping a predetermined region.

The image processor 220 may determine the ROI in accordance with the ROI information input by the user via the input unit 300 or through image analysis, for example, when there is no user input. When the ROI is determined, the image processor 220 may determine the method of processing the ROI.

The image processor 220 may modify the original image according to the determined method and partitions the modified image based on the number of the IDEs and the size and location of the IDEs. Accordingly, a region to be displayed by each IDE may be determined in the modified image. In addition, the image processor 220 may transmit image information of a corresponding region to each IDE via the communication unit 210 and output the modified image through the display unit 100.

Figure 8A:
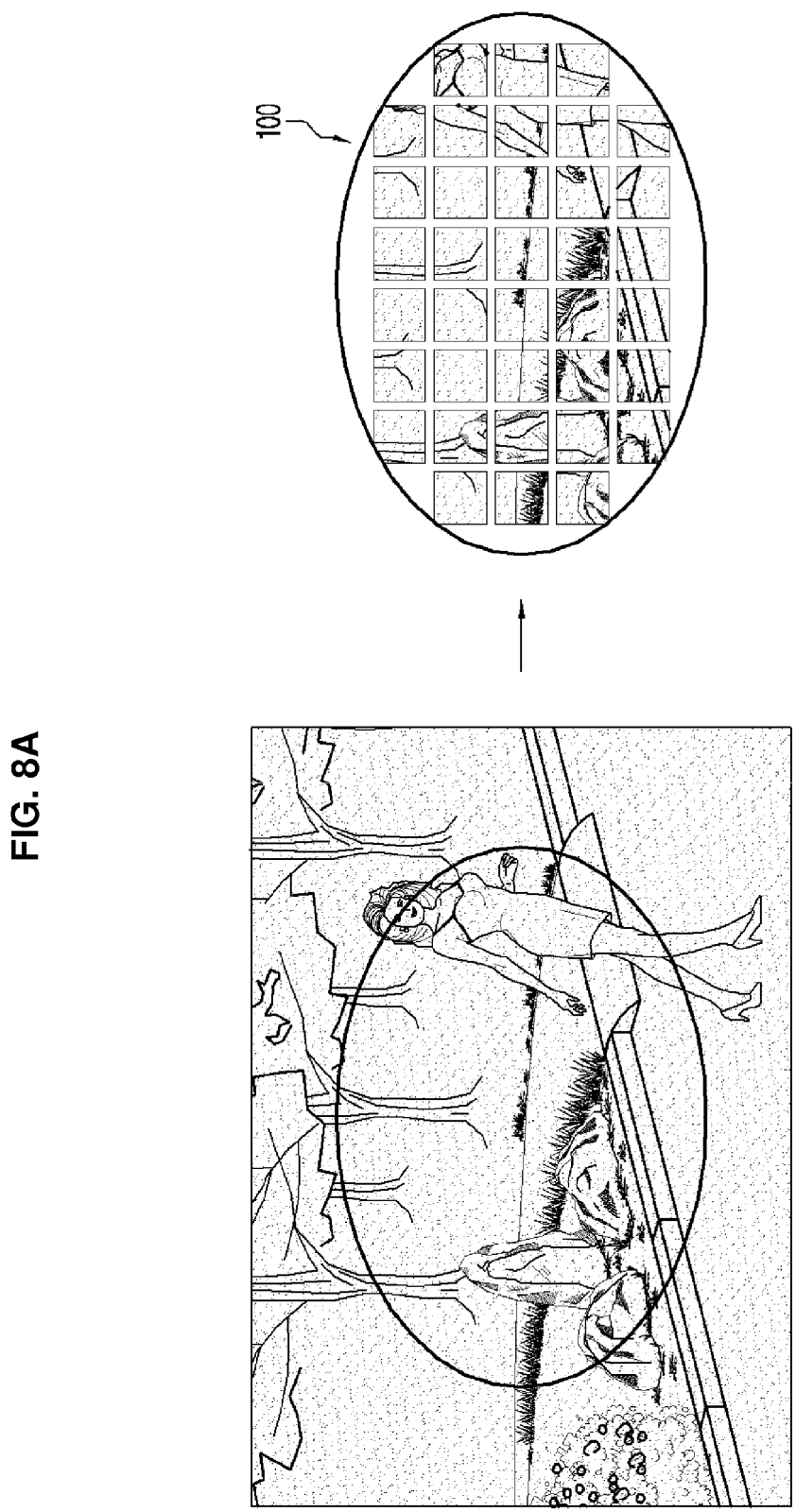

FIGS. 8A through 8C are diagrams illustrating various methods of modifying an original image. In these examples, the original image is illustrated on the left side of each diagram, and an image modified in accordance with the oval display unit 100 is illustrated on the right side of each diagram.

In a first example, the image processor 220 may clip the original image in accordance with the size and shape of the display unit 100 such that an image as illustrated on the right side of FIG. 8A is output. Accordingly, the image shown on the right side of FIG. 8A is clipped and has the same size as the image from the oval on the left side of FIG. 8A.

As another example, the image processor 220 may reduce the original image in based on a height and width of the modified display unit 100 such that an image as illustrated on the right side of FIG. 8B is output. For example, the reduced image on the right side of FIG. 8B may illustrate everything illustrated in the oval of the left side of FIG. 8B, the only difference being that the content illustrated on the right is smaller in proportion to the content illustrated on the left.

The image processor 220 may also determine the ROI based on a ROI information input by the user via the input unit 300 or through image analysis as illustrated on the left side of FIG. 8C. In this example, the image processor 220 may enlarge the ROI in accordance with the height and width of the display unit 100 and clip the remainder of the enlarged image in accordance with the shape of the display unit 100 such that an image as illustrated on the right side of FIG. 8C is output. In this example, the ROI from the image on the left is enlarged within the display unit 100.

Referring back to FIG. 2, the controller 240 may control the overall operation of the display apparatus 1. The controller 240 may create a control signal to control the power supply 400 to supply power to each component of the display unit 100. The controller 240 may also control the communication unit 210 such that signals are transmitted and received between the various components of the communication unit 210.

For example, the controller 240 may create a control signal to transmit a request signal to each of the IDEs and to receive a response signal from the IDE. As another example, the controller 240 may create a control signal such that the image processor 220 receives information about image processing input by the user via the input unit 300 through the communication unit 210. As another example, the controller 240 may create a control signal such that each of the IDEs receives image information of a corresponding region from the image processor 220 through the communication unit 210 and outputs the image information.

The controller 240 may also create a control signal such that the communication unit 210 receives a signal generated by an external device.

The controller 240 may create a control signal such that the image processor 220 modifies the original image in accordance with the shape of the display unit 100. For example, the controller 240 may create control signals such that the image processor 220 determines the shape of the display unit 100, determines a method for modifying the original image, determines the ROI, or determines the method of processing the ROI, respectively. The controller 240 may control the image processor 220 to modify the original image according to the determined method and determine a region of the IDEs to display the modified image.

The storage unit 230 may store data and algorithms for manipulation of the display apparatus 1. The data may include an index of each of the IDEs included in the initial display unit 100 at the manufactured stage or may separately store the index of the IDE transmitting the response signal in response to the request signal.

The algorithms may include algorithm to determine the shape of the display unit 100, an algorithm to modify the original image, an algorithm to determine the ROI, an algorithm to determine a method of processing the ROI, and the like. The storage unit 230 may also store an algorithm to modify the original image according to the determined methods, an algorithm to determine a region to be displayed by the IDEs in the modified image, and the like.

The storage unit 230 may include, for example, a non-volatile memory such as a read only memory (ROM), a programmable read only memory (PROM), an erasable programmable read only memory (EPROM), and a flash memory, a volatile memory such as a random access memory (RAM), and a storage device such as a hard disk drive and an optical disc. It should also be appreciated that the storage unit 230 is not limited thereto and may also be implemented using various other devices known in the art.

FIG. 9 is a flowchart illustrating a method of controlling a display apparatus according to an exemplary embodiment.

Referring to FIG. 9, the communication unit 210 transmits a request signal to the IDEs asking whether each of the IDEs included in the initial display unit 100 is activated, at 500.

The initial display unit 100 refers to a display unit 100 that is not manipulated by the user, i.e., a display unit 100 maintaining its original shape. As described above with reference to FIG. 5, the initial display unit 100 may include a plurality of IDEs which have M rows arranged along the longitudinal direction and N rows arranged along the lateral direction creating an overall rectangular shape. Each IDE may have an index indicating a physical location, and the index may be pre-stored in the storage unit 230.

Then, whether the communication unit 210 receives a response signal from each of the IDEs included in the initial display unit 100 or a deformed display unit 100 is determined, at 510. For example, the communication unit 210 may receive a response signal from all of the IDEs, from some of the IDEs, or from none of the IDEs. The response signal may include not only the signal indicating that the IDE is in an activated state, i.e., in a state capable of displaying an image, but also the index indicating the physical location.

If the display unit 100 is deformed via manipulation by the user as described above, the communication unit 210 may receive the response signal from each IDE of the deformed display unit 100. If the display unit 100 is not deformed, the communication unit 210 may receive the response signal from each IDE of the initial display unit 100. Furthermore, if the communication unit 210 does not receive a response signals from any of the IDEs, it is determined that the display unit 100 is not on or is otherwise not available, and the method ends.

In response to the communication unit 210 receiving the response signals from the IDEs, the image processor 220 determines an activated region or the shape of the display unit 100 based on the received response signals (520). For example, the image processor 220 may determine the activated region or the shape of the display unit 100 by estimating the locations of the IDEs transmitting the response signals based on the indexes of the IDEs included in the response signals. For example, the indexes of the IDEs transmitting the response signals may be stored in the storage unit 230. Accordingly, the image processor 220 may determine the shape of the display unit 100 using the stored indexes.

The image processor 220 determines a method of modifying the original image and a ROI, at 530. For example, the image processor 220 may determine to modify the original image by resizing the original image at a predetermined rate, i.e., as enlarging or reducing the original image at the predetermined rate. The predetermined rate may be input by the user via the input unit 300 or may be determined by the image processor 220 through image analysis when there is no user input. As another example, the image processor 220 may determine to modify the original image by clipping a predetermined region of the original image.

The image processor 220 may determine the ROI in accordance with the ROI information input by the user via the input unit 300 or through image analysis when there is no user input. In some examples, operation 530 may further include determining a method of processing the ROI.

The image processor 220 modifies the original image according to the determined methods, and determines a region to be displayed by the IDEs in the modified image, in 540. Then, the image processor 220 transmits an image of the determined region to each of the IDEs through the communication unit 210, in 550. The IDEs display the image transmitted through the communication unit 210, in 560. As a result, the modified image may be output in accordance with the shape of the display unit 100.

According to various aspects, provided herein is a display apparatus that may be modified in size and shape to enhance user convenience. For example, the display apparatus may be modified from its original state such as a rectangular shape, into another desired shape such as a square, an oval, a circle, and the like. In addition, a region of interest may be extracted from an original image and be enlarged, or reduced while being viewed on the modified display apparatus.

According to the display apparatus and a method of controlling the same, in the exemplary embodiments the shape of the display may be deformed as users' desire, and an image may be displayed even when independent display elements are partially inactivated.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A display apparatus comprising:
   a display comprising a plurality of independent display elements (IDEs) configured for shape deformation; and
   a controller configured to determine whether the display is deformed by transmitting a plurality of signals to the plurality of IDEs and receiving signals output from the plurality of IDEs in response to the transmitted signals,
   wherein the transmitted plurality of signals comprise a request signal asking whether a respective IDE is in a state capable of displaying an image.

2. The display apparatus of claim 1, wherein a shape of the display is deformed by removing some IDEs from or by adding some IDEs to the plurality of IDEs.

3. The display apparatus of claim 1, wherein each IDE comprises an index indicating a physical location of the IDE on the display.

4. The display apparatus of claim 1, wherein the controller is configured to transmit the request signal to each of the plurality of IDEs comprised in the display before deformation.

5. The display apparatus of claim 1, wherein the signals output from the plurality of IDEs comprise a response signal indicating that a respective IDE is in a state capable of displaying an image.

6. The display apparatus of claim 5, wherein the controller is configured to receive response signals from each of the IDEs included in a deformed display.

7. The display apparatus of claim 6, wherein the controller is configured to determine a shape of the deformed display based on the indexes included in the response signals.

8. The display apparatus of claim 5, wherein the response signal comprises an index of a respective IDE.

9. The display apparatus of claim 1, wherein the controller is configured to determine a method of processing an image for the display based on a shape of a deformed display.

10. The display apparatus of claim 9, wherein the method of processing the image comprises resizing the image or clipping the image to correspond to the shape of the deformed display.

11. The display apparatus of claim 9, wherein the controller is configured to process the image according to the determined image processing method.

12. The display apparatus of claim 9, wherein the controller is configured to determine a region to be displayed as IDEs included in the deformed display.

13. The display apparatus of claim 12, wherein each of the IDEs included in the deformed display is configured to display the processed image to correspond to the determined region.

14. The display apparatus of claim 1, wherein the display comprises a flexible display, and the flexible display is deformed by a user cutting or tearing IDEs from the flexible display.

15. A method of controlling a display apparatus, the method comprising:
   transmitting a plurality of signals to a display comprising a plurality of independent display elements (IDEs) configured for shape deformation; and
   determining whether the display is deformed based on signals received from the plurality of IDEs in response to the transmitted signals,
   wherein the transmitting of the plurality of signals comprises transmitting a request signal asking whether a respective IDE is in a state capable of displaying an image.

16. The method of claim 15, wherein a shape of the display is deformed by removing some IDEs from or by adding some IDEs to the plurality of IDEs.

17. The method of claim 15, wherein each IDE comprises an index indicating a physical location of the IDE on the display.

18. The method of claim 15, wherein the transmitting of the plurality of signals comprises transmitting the request signal to each of the plurality of IDEs included in the display before deformation.

19. The method of claim 15, wherein the received output signals comprise a response signal from each IDE indicating whether the respective IDE is in a state capable of displaying an image.

20. The method of claim 19, wherein the received output signals comprise response signals received from each of the IDEs included in the deformed display.

21. The method of claim 19, wherein the response signal comprises an index of a respective IDE.

22. The method of claim 21, wherein the determining whether the display is deformed comprises determining a shape of the deformed display based on the indexes included in the received response signals.

23. The method of claim 15, further comprising determining a method of processing an image based on a shape of a deformed display.

24. The method of claim 23, wherein the method of processing the image comprises resizing the image or clipping the image to correspond to the shape of the deformed display.

25. The method of claim 23, further comprising processing the image according to the determined image processing method.

26. The method of claim 23, further comprising determining a region to be displayed as IDEs included in the deformed display.

27. The method of claim 26, further comprising displaying the processed image to correspond to the determined region by each of the IDEs included in the deformed display.

28. A control apparatus for controlling a plurality of independent display elements (IDEs) of a display, the control apparatus comprising:
- a communicator configured to transmit and receive signals to and from the plurality of IDEs included in the display; and
- a controller configured to determine IDEs that are active and IDEs that are inactive, based on signals received from the plurality of IDEs, and to transmit a display signal to the plurality of IDEs based on a shape of the IDEs that are inactive,
- wherein the transmitting of the plurality of signals comprises transmitting a request signal asking whether a respective IDE is in a state capable of displaying an image, and
- wherein the received output signals comprise a response signal from each IDE indicating whether the respective IDE is in a state capable of displaying an image.

29. The control apparatus of claim 28, wherein the controller determines the shape based on indexes included in the signals received from the plurality of IDEs.

* * * * *